US012470383B2

(12) United States Patent
Vinayagamurthy et al.

(10) Patent No.: US 12,470,383 B2
(45) Date of Patent: Nov. 11, 2025

(54) COLLABORATIVE COMPUTATION ACROSS BLOCKCHAIN NETWORKS

(71) Applicant: INTERNATIONAL BUSINESS MACHINES CORPORATION, Armonk, NY (US)

(72) Inventors: Dhinakaran Vinayagamurthy, Erode (IN); Krishnasuri Narayanam, Bangalore (IN); Venkatraman Ramakrishna, Bangalore (IN); Ermyas Abebe, Victoria (AU); Angelo De Caro, Zürich (CH); Yining Hu, Pyrmont (AU); Vinayaka Pandit, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 17/901,130

(22) Filed: Sep. 1, 2022

(65) Prior Publication Data
US 2024/0080191 A1  Mar. 7, 2024

(51) Int. Cl.
*H04L 9/32* (2006.01)
*H04L 12/18* (2006.01)

(52) U.S. Cl.
CPC .......... *H04L 9/32* (2013.01); *H04L 12/1813* (2013.01); *H04L 2209/46* (2013.01)

(58) Field of Classification Search
CPC ... H04L 9/32; H04L 12/1813; H04L 2209/46; H04L 12/18; H04L 9/3218; H04L 9/3247; H04L 9/50
See application file for complete search history.

(56) References Cited

U.S. PATENT DOCUMENTS 10,250,381 B1 * 4/2019 Rice ................. H04L 9/0643
10,423,961 B1 * 9/2019 El Defrawy ......... G06Q 20/065
(Continued)

FOREIGN PATENT DOCUMENTS

CN  111967985  10/2020
CN  114579857  6/2022
(Continued)

OTHER PUBLICATIONS

Wang, et al. "Information Sharing and Secure Multi-party Computing Model Based on Blockchain" Computer Science, Sep. 30, 2019; 7 Pages.
(Continued)

*Primary Examiner* — Javier O Guzman
(74) *Attorney, Agent, or Firm* — Aaron Pontikos; Andrew D. Wright; Calderon Safran & Wright P.C.

(57) ABSTRACT

A system and method for a multi-party computation (MPC) is provided. In implementations, a method includes identifying a blockchain network and a computing device to perform an MPC based on an index; generating an MPC request including a function to be performed by the blockchain network and the computing device, data required for the function, and a verification policy defining a verification protocol to be performed by the blockchain network and the computing device; sending the MPC request to the blockchain network and the computing device; and receiving responses from a representative computing node of the blockchain network and the computing device, wherein each of the responses includes: an output of an MPC protocol performed by the blockchain network and the computing device to jointly compute the function while keeping the inputs private from one another and private from the computing system; and a proof based on the verification policy.

20 Claims, 8 Drawing Sheets

(56) References Cited

U.S. PATENT DOCUMENTS

| | | | | |
|---|---|---|---|---|
| 10,742,421 | B1* | 8/2020 | Wentz | H04L 9/0897 |
| 10,819,522 | B1* | 10/2020 | Roy | G06F 21/46 |
| 11,038,679 | B2* | 6/2021 | Li | G06F 7/582 |
| 11,295,381 | B2* | 4/2022 | Du | G06Q 40/03 |
| 11,329,825 | B2* | 5/2022 | Gallagher | H04L 9/3239 |
| 11,671,258 | B1* | 6/2023 | Willardson | H04L 9/3297 |
| | | | | 380/1 |
| 12,231,543 | B2* | 2/2025 | Le Van Gong | H04L 9/0825 |
| 2009/0177591 | A1* | 7/2009 | Thorpe | G06Q 40/06 |
| | | | | 705/37 |
| 2019/0116180 | A1* | 4/2019 | Teranishi | G06F 21/32 |
| 2019/0334695 | A1* | 10/2019 | Veeningen | H04L 9/0825 |
| 2019/0369959 | A1* | 12/2019 | Veeningen | H04L 67/10 |
| 2020/0004973 | A1* | 1/2020 | Li | H04L 9/0643 |
| 2020/0034550 | A1* | 1/2020 | Kim | H04L 9/085 |
| 2021/0051007 | A1* | 2/2021 | Li | H04L 9/085 |
| 2021/0218576 | A1* | 7/2021 | Meng | H04L 9/0643 |
| 2021/0328798 | A1* | 10/2021 | Liu | H04L 9/3221 |
| 2022/0045849 | A1* | 2/2022 | Jing | H04L 9/088 |
| 2023/0283461 | A1* | 9/2023 | Cheng | H04L 9/0869 |
| | | | | 713/189 |
| 2023/0421396 | A1* | 12/2023 | Ocegueda | H04L 9/50 |
| 2024/0070659 | A1* | 2/2024 | Boo | G06Q 40/04 |

FOREIGN PATENT DOCUMENTS

| | | | |
|---|---|---|---|
| CN | 119817058 A | 4/2025 | |
| WO | 2024/045911 A1 | 3/2024 | |

OTHER PUBLICATIONS

Govindarajan, et al. "Privacy-Preserving Decentralized Exchange Marketplaces" 2022 IEEE International Conference on Blockchain and Cryptocurrency, Jun. 29, 2022; 10 Pages.

Ghosh, et al. "Privacy-Preserving Negotiation of Common Trust Anchors Across Blockchain Networks" 2022 IEEE International Conference on Blockchain and Cryptocurrency, Jun. 29, 2022; 6 Pages.

Huang, et al. "Constructing fair secure multi-party computation based on blockchain" Application Research of Computers, Jan. 31, 2020; 7 Pages.

Narula, "zkLedger: Privacy-Preserving Auditing for Distributed Ledgers", USENIX Association, Apr. 9-11, 2018, 17 pages.

Ledger Insights, "R3 launches Conclave for confidential computing", Feb. 11, 2021, https://www.ledgerinsights.com/r3-launches-conclave-for-confidential-computing/, 3 pages.

Ren et al., "Cloak: Enabling Confidential Smart Contract with Multi-party Transactions", Feb. 21, 2022, 18 pages.

Ledger Insights, "AntChain blockchain supports confidential computing using Ant's own chip", https://www.ledgerinsights.com/antchain-blockchain-supports-confidential-computing-using-ants-own-chip/, Oct. 25, 2021, 4 pages.

Abebe et al., "Enabling Enterprise Blockchain Interoperability with Trusted Data Transfer (Industry Track)", https://dl.acm.org/doi/10.1145/3366626.3368129, Dec. 2019, 3 pages.

* cited by examiner

|  | P1 ($d_1$) | P2 ($d_2$) | P3 ($d_3$) |
|---|---|---|---|
| Step 1 | $d_1 \rightarrow (x_{11}, x_{12}, x_{13})$<br>$x_{21}$ $\mathbf{x_{31}}$ | $d_2 \rightarrow (x_{21}, x_{22}, x_{23})$<br>$x_{12}$ $x_{32}$ | $d_3 \rightarrow (\mathbf{x_{31}}, x_{32}, x_{33})$<br>$x_{13}$ $x_{23}$    602 |
| Step 2 | $(x_{11}, x_{21}, \mathbf{x_{31}}) \rightarrow$<br>$(\mathbf{y_{11}}, y_{12}, \mathbf{y_{13}})$<br>600A   $y_{21}, y_{31}$<br>   604 | $(x_{12}, x_{22}, x_{32}) \rightarrow$<br>$(y_{21}, y_{22}, y_{23})$<br>600B   $y_{12}, y_{32}$ | $(x_{13}, x_{23}, x_{33}) \rightarrow$<br>$(y_{31}, y_{32}, y_{33})$<br>600C   $\mathbf{y_{13}}, y_{23}$ |
| Step 3 | $(y_{11}, y_{21}, y_{31}) \rightarrow \mathbf{z}$ | $(y_{12}, y_{22}, y_{32}) \rightarrow \mathbf{z}$ | $(\mathbf{y_{13}}, y_{23}, y_{33}) \rightarrow \mathbf{z}$ |

FIG. 6

COLLABORATIVE COMPUTATION ACROSS BLOCKCHAIN NETWORKS

BACKGROUND

Aspects of the present invention relate generally to cryptography, and, more particularly, to collaborative computation across blockchain networks.

Secure multi-party computation, also known as secure computation, or multi-party computation (MPC), is a cryptographic tool enabling individual parties to jointly compute a function over their inputs while keeping those inputs (e.g., raw data) private. In an MPC, a given number of participants, $P_1, P_2, \ldots, P_N$, each have private data, respectively $D_1, D_2, \ldots, D_N$. Participants want to compute the value of a public function $f$ on that private data: $f(D_1, D_2, \ldots, D_N)$ while keeping their own inputs secret. Various MPC protocols exist, including SPDZ (pronounced "Speedz"), which is the name of a common MPC protocol, and garbled circuit protocol, which enables two-party secure computations.

In general, blockchain is a type of distributed ledger technology (DLT) comprising a shared, immutable ledger that facilitates the process of recording transactions and tracking assets in a computer network. An asset can be tangible or intangible. Permissioned DLT/blockchain networks store data records in shared ledgers that are inaccessible to external entities by design. Blockchain is beneficial for delivering information because it provides immediate, shared and completely transparent information stored on the immutable ledger that can be accessed only by permissioned network members.

In general, a blockchain works by recording each transaction moving an asset as a "block" of data. Each block can record information regarding the transaction (e.g., who, what, when, where and how), and is connected to the blocks before and after it, forming a chain of data as the asset moves from place to place or ownership changes hands. The blocks are stored across multiple computers (decentralized storage). The blocks are synchronized over a variety of locations, and are tamper resistant. The blocks confirm the exact time and sequence of transactions, and are linked securely together to prevent any block from being altered and prevent a block from being inserted between two existing blocks.

SUMMARY

In a first aspect of the invention, there is a computer-implemented method including: identifying, by a computing system, a select blockchain network and a select computing device to perform a multi-party computation (MPC) based on an index of a plurality of blockchain networks and computing devices indicating a type of data obtainable by each of the plurality of blockchain networks and computing devices; generating, by a computing system, an MPC request including at least one computational function to be performed cooperatively by the select blockchain network and the select computing device, data required for the at least one computational function from each of the select blockchain network and the select computing device, and a verification policy defining at least one verification protocol to be performed by each of the select blockchain network and the select computing device; sending, by the computing system, the MPC request to each of the select blockchain network and the select computing device via a network connection; and receiving, by the computing system, a response from a representative computing node of the select blockchain network and a response from the select computing device, wherein each of the responses includes: an MPC output of an MPC protocol performed by the select blockchain network and the select computing device to jointly compute the at least one computational function over inputs of the respective select blockchain network and select computing device while keeping the respective inputs private from one another and private from the computing system; and a computational proof based on the verification policy.

In another aspect of the invention, there is a computer program product including one or more computer readable storage media having program instructions collectively stored on the one or more computer readable storage media. The program instructions are executable to: send a multi-party computation (MPC) request to each of a plurality of blockchain networks, the MPC request including at least one computational function to be performed cooperatively by the plurality of blockchain networks, data inputs required for the at least one computational function, and a verification policy defining at least one verification protocol to be performed by each of the plurality of blockchain networks; and receive a response from respective representative computing nodes of the plurality of blockchain networks, wherein each of the responses includes: an MPC output; and a computational proof based on the verification policy, wherein the MPC output is jointly computed by the plurality of blockchain networks using an MPC protocol while keeping raw data of the respective plurality of blockchain networks private from one another, and wherein the MPC output is computed from, but does not disclose, the raw data from the plurality of blockchain networks.

In another aspect of the invention, there is system including a processor set, one or more computer readable storage media, and program instructions collectively stored on the one or more computer readable storage media. The program instructions are executable by at least one representative computing device of a first blockchain network to: receive a multi-party computation (MPC) request from a remote computing system, the MPC request including at least one computational function to be performed cooperatively by the first blockchain network and a second blockchain network, data inputs required for the at least one computational function, and a verification policy defining at least one verification protocol to be performed by each of the first and second blockchain networks; initiate and perform steps of an MPC protocol with the second blockchain network, thereby cooperatively generating an MPC output based on the computational function in the MPC request and in compliance with the verification policy of the MPC request, wherein the MPC output is jointly computed by the first and second blockchain networks using the MPC protocol while keeping raw data of the respective first and second blockchain networks private from one another, and is computed from, but does not disclose to the remote computing system, raw data from the first and second blockchain networks, and wherein each of the first and second blockchain networks selects the raw data to use in the MPC protocol based on the data inputs in the MPC request, thereby ensuring validity of inputs to the MPC protocol; and send the MPC output to the remote computing system in response to the MPC request.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 6 illustrates an exemplary three step MPC protocol among representative nodes of three blockchain networks in accordance with aspects of the present invention.

DETAILED DESCRIPTION

Figure 1:
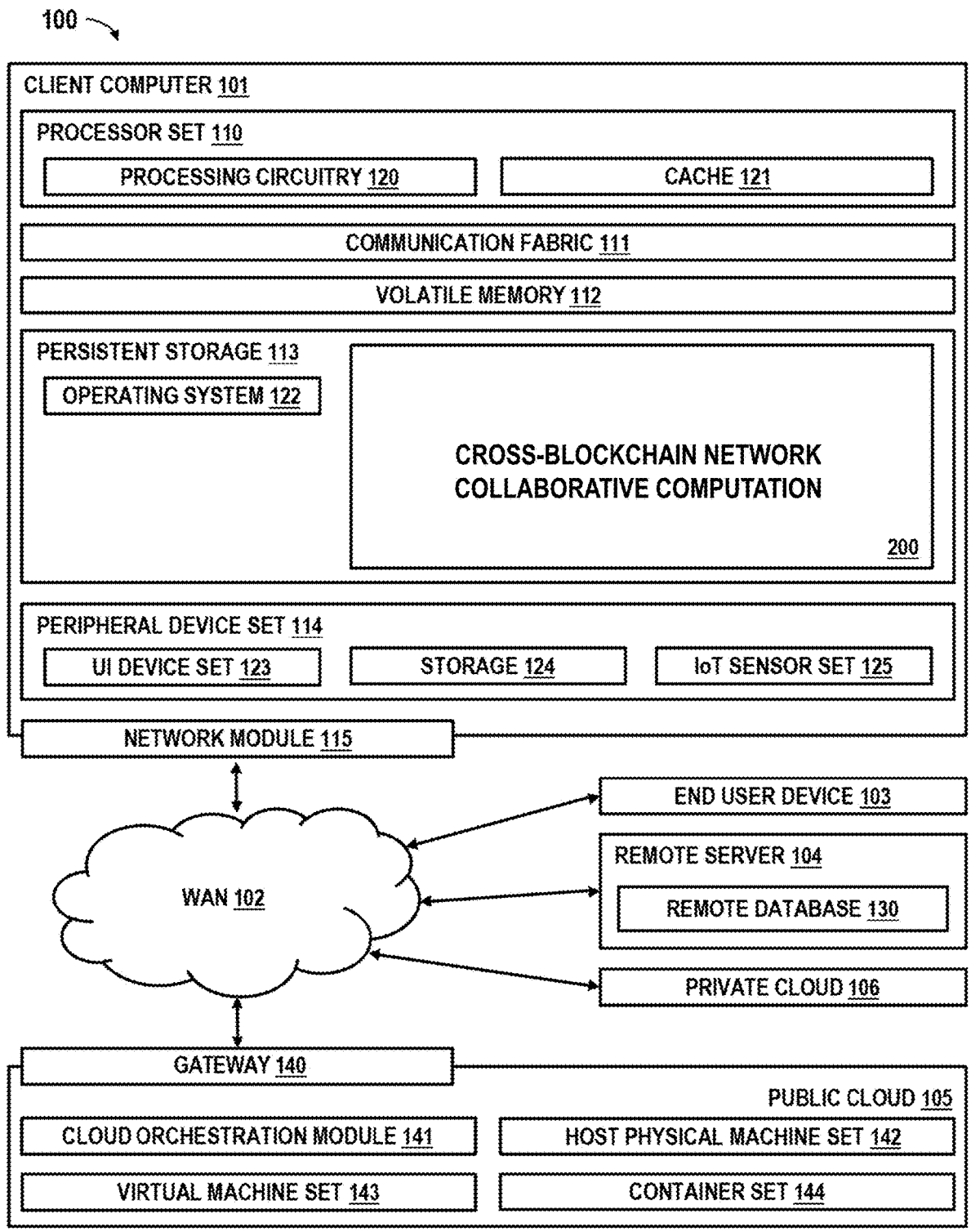
FIG. 1 depicts a computing environment according to an embodiment of the present invention.

Aspects of the present invention relate generally to cryptography, and, more particularly, to collaborative computation across blockchain networks. In embodiments, a system and method are provided for secure multi-party computation (MPC) among contributing networks (e.g., permissioned blockchain networks) and/or computing devices to compute data required by a requesting/recipient network, with intermediate outputs corroborated among the contributing networks and/or computing devices and the final output verified by the requesting/recipient network via cross-network trusted data sharing. In implementations, each participating blockchain network includes a blockchain ledger that records each MPC protocol transaction moving as a "block" of data. Each block can record information regarding a transaction (e.g., a calculation), and is connected to the blocks before and after it, forming a chain of data as the MPC protocol progresses.

Permissioned DLT/blockchain networks store data records in shared ledgers that are inaccessible to external entities by design. However, data recorded in one network is often crucial to enforcing a smart contract in a trustworthy manner in a different network. The term smart contract as used herein refers to a computer program or transaction protocol which is intended to automatically execute, control, or document legally relevant events and actions according to the terms of a contract or agreement. Sharing schemes have been proposed to allow data to be shared between blockchains with proof of authenticity and provenance. However, existing data sharing schemes offer limited privacy and confidentiality guarantees for complex multi-network data queries and responses. A network (or party within a network) may be unwilling to share raw data with an external entity or other network, but multiple networks or parties may be collectively willing to provide information aggregated or derived from the individual raw data.

Embodiments of the invention provide an improved cryptographic tool supporting private computations across distributed ledger networks (distributed blockchain networks) without the need to rely on trusted network proxies or third parties. Systems and methods discussed herein are necessarily rooted in computer technology in order to overcome problems arising in the realm of computer networks. Specifically, embodiments of the invention address the problem of obtaining desired computational outputs based on private data distributed over multiple permissioned networks and/or computing devices.

It can be understood that there are numerous use-cases in which it is desirable to derive insight from multiple data sources without revealing raw information to the requesting party or other intermediaries. Some examples include: (1) a party (individual, business), who owns assets across multiple networks (Central Bank Digital Currencies, stocks, bonds, cryptocurrencies etc.), might need to prove information about its aggregate holdings (e.g., total net worth, outstanding liabilities, capital adequacy) to an auditor, tax authority, lender or other entity, without divulging detailed holdings across each of those networks; (2) industry or sector wide reporting (often published by regulators or industry bodies), may need to derive information from multiple networks, while ensuring privacy and confidentiality, in addition to accuracy and completeness; and (3) parties might need to prove regulatory compliance to regulators and auditors regarding their transactions within and across networks, without revealing the detailed history of each transaction.

The following exemplary scenario illustrates the need for the improved cryptographic tool according to embodiments of the invention. In this example, $N_1$, $N_2$, and $N_3$ are independent CBDC (Central Bank Digital Currency) networks. Alice is a user who maintains CBDC accounts in both $N_2$ and $N_3$. A smart contract in $N_1$, which contains a limit authority (e.g., European Bank Agency), needs to enforce different rules depending on whether Alice's total account balance (i.e., sum of balances in $N_2$ and $N_3$) exceeds some amount X. Neither $N_2$ nor $N_3$ wishes to reveal their respective account balances for Alice to the other networks, but are willing to share information in a privacy-preserving manner.

In the context of blockchain networks, information resides across multiple networks, and the primary constraint would be to ensure that: a requesting party does not learn about raw information (e.g., raw data) in any of the networks; networks do not learn about raw information (e.g., raw data) residing in other networks; and the requesting party can obtain assurance that the aggregate insight was computed correctly, and that the inputs to the aggregates were correct data according to the consensus rules of the contributing blockchain networks.

A permissioned blockchain can be thought of as a data silo accessible only to authorized parties. Implementations of the invention provide a way to extract more value from the data silo by combining the data silo's stored data with external data in a secure fashion using MPC. In implementations, participants in a collaborative computation across blockchain networks have access to blockchain software, such as open source blockchains and related tools available through the Hyperledger® project, a project started in December 2015 by the Linux Foundation. Hyperledger® is a registered trademark of the Linux Foundation.

Implementations of the invention enable separate permissioned blockchain networks to collectively serve as input providers to an MPC. This is distinguished from existing MPC protocols wherein input providers are individuals on a network. Embodiments of the invention advantageously provide end-to-end provenance for the participants of the MPC protocol, and for recipients who are non-participants. The term end-to-end provenance as used herein refers to the complete history of the one or more computations performed by participants of the MPC protocol or the complete history of how a computational output is generated by the MPC protocol, where the history, without revealing additional information on the private computational inputs, serves as a guarantee on the validity of the computation output to even a non-participant of the MPC. In aspects, a method provides a guarantee on the validity of the computational inputs for a non-participant who is receiving the MPC output, and a guarantee on the correctness of the output for a non-participant (and participants). Additionally, embodiments of the invention guarantee privacy by adapting MPC protocols with trustworthy cross-ledger data sharing schemes, in a manner that does not require parties (e.g., nodes of a blockchain) to reveal raw data to one another for computation and verification purposes. Aspects of the invention also offer resilience to the failure of network members running the MPC protocol.

In embodiments, a method from the perspective of a user obtaining data comprises: querying, by a query/response computing system $N_R$, participating/contributing networks $(N_1, \ldots N_k)$ on data that the query/response computing system $N_R$ requires from each of the participating/contributing networks, the query including (i) a function, and (ii) verification policies for each contributing network; receiving, by the query/response computing system $N_R$, a result (MPC output) and a proof from a respective representative of each of the participating/contributing networks; verifying, by the query/response computing system $N_R$, the proof from each of the respective representatives via a smart contract; in response to verifying the proofs, accepting, by the query/response computing system $N_R$, the results; optionally, performing, by the query/response computing system $N_R$, a further computation based on the results; optionally, decrypting, by the query/response computing system $N_R$, the results; and updating, by the query/response computing system $N_R$, ledger records based on the results and/or the further computation.

In embodiments, a method from the perspective of a group of participating/contributing blockchain networks comprises, for each blockchain network in the group of participating/contributing blockchain networks: receiving, by a computing device of a blockchain network, a request for data (MPC request) from a remote computing device; choosing, by the computing device of the blockchain network, a representative Pi, wherein the choosing may be arbitrary and replaceable; initiating and running, by the representative Pi, an MPC protocol to generate a computational output while ensuring fault-tolerance and verification by other network members, wherein the MPC protocol includes producing and recording a succinct proof on the correctness of computation of the computational output in a blockchain ledger, and communicating between the other network members using a cross-network data sharing protocol; and providing, by the representative Pi, the computational output with the proof on the correctness of the computation of the computational output to the remote computing device in response to the request for data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as cross-blockchain network collaborative computation 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
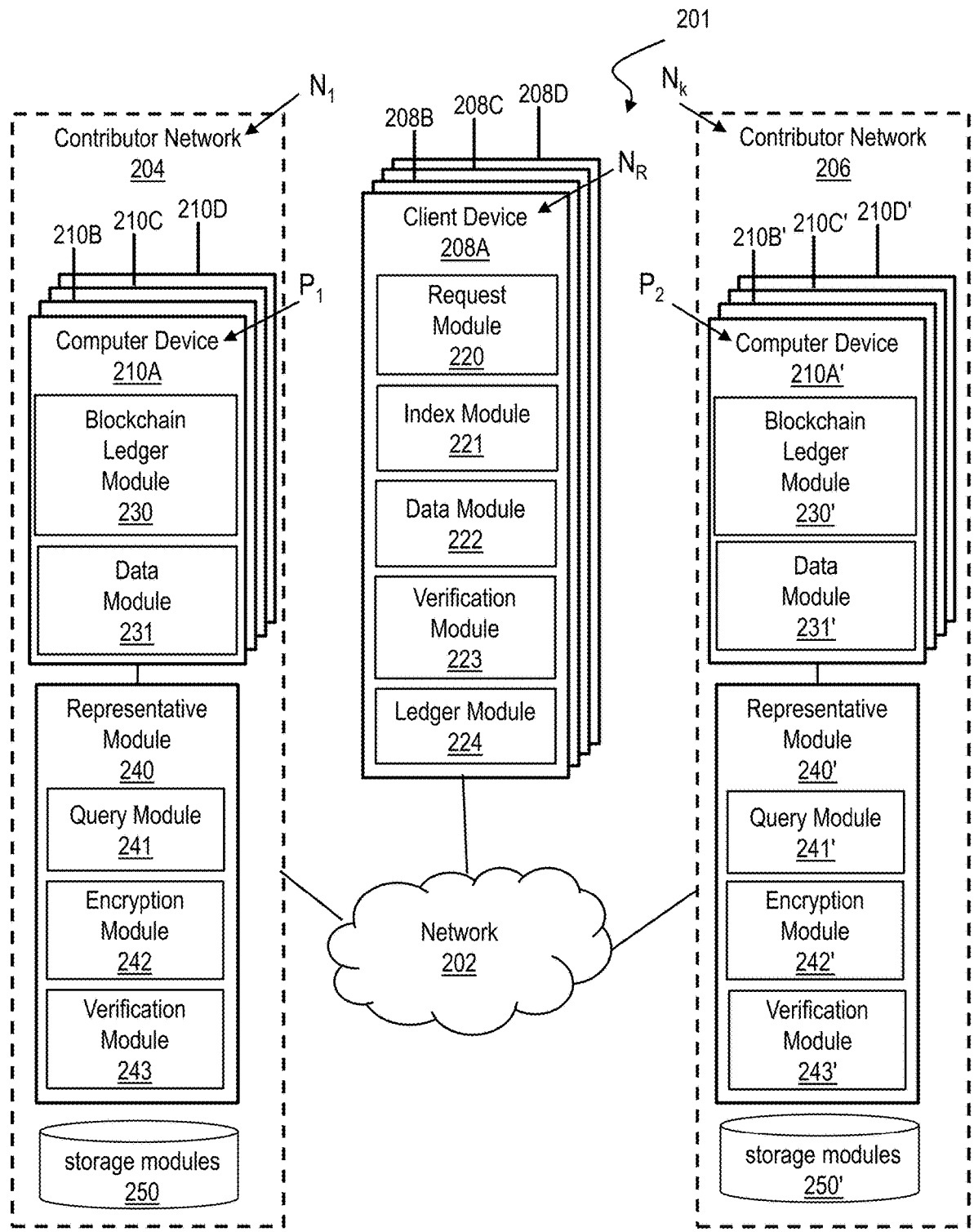
FIG. 2 shows a block diagram of an exemplary collaborative computing environment in accordance with aspects of the present invention.

FIG. 2 shows a block diagram of an exemplary collaborative computation environment 201 in accordance with aspects of the invention. The collaborative computational environment 201 may be located within the computing environment 100 of FIG. 1. In embodiments, the collaborative computation environment 201 includes a network 202 (e.g., WAN 102 of FIG. 1) enabling communication between a plurality of client devices, represented by 208A-208D, and a plurality of contributor networks, represented by contributor networks 204 and 206.

The client devices 208A-208D may each comprise an instance of the computer 101 of FIG. 1, or elements thereof, and may be used alone or as part of a network of computing devices (e.g., a permissioned blockchain network). In implementations, each of the client devices 208A-208D comprises computing nodes in a cloud computing environment. In embodiments, the client devices 208A-208D include computer software providing computational services to one or more paying customers (e.g., via an end user device 103 of FIG. 1). In implementations of the invention, each of the client devices 208A-208D houses computer readable program instructions (e.g., the code in block 200 of FIG. 1) to cause a series of operational steps to be performed by processor sets (e.g., processor set 110 of FIG. 1) of the respective client devices 208A-208D, thereby effecting a computer-implemented method discussed in more detail below.

The computer readable program instructions of the client devices 208A-208D may be stored as one or more modules in various types of computer readable storage media (e.g., persistent storage 113 of FIG. 1). For illustrative purposes, client device 208A is shown as a requesting node $N_R$ of the collaborative computation environment 201, which is configured to initiate a cross-blockchain network collaborative computation in accordance with embodiments of the invention. By way of example, client device 208A is depicted as including: a request module 220 configured to generate and send data queries/requests (MPC requests) to a plurality of contributor networks 204 and 206 (e.g., blockchain networks); an index module 221 configured to house and manage information regarding participants in the environment 201; a data module 222 configured to decrypt incoming results responsive to the data queries/requests and/or utilize outputs from the results in one or more computations to generate new outputs; a verification module 223 configured to verify the incoming results (MPC outputs); and a ledger module 224 configured to update and manage ledger data of a ledger (e.g., a blockchain ledger) of the client device 208A.

The contributor network 204 may include a plurality of computer resources, including computer devices 210A-210D, for example. Each of the computer devices 210A-210D may comprise an instance of the client computer 101 of FIG. 1, or elements thereof. In implementations, the computer devices 210A-210D are participants in a permissioned blockchain network. In aspects of the invention, each of the computer devices 210A-210D houses computer readable program instructions to cause a series of operational steps to be performed by processor sets (e.g., processor set 110 of FIG. 1) of the respective computer devices 210A-210D, thereby effecting a computer-implemented method discussed in more detail below.

The computer readable program instructions of the computer devices 210A-210D may be stored as one or more modules in various types of computer readable storage media (e.g., persistent storage 113 of FIG. 1). By way of example, computer device 210A is depicted as including: a blockchain ledger module 230 configured to update and maintain a blockchain ledger of the computer device 210A; a data module 231 configured to access data (raw data) in one or more storage modules 250 for use as computational inputs in an MPC protocol, and a representative module 240 configured to execute MPC protocols in response to incoming data requests.

As depicted in the example of FIG. 2, the representative module 240 may include a query module 241 configured to process an incoming data query/request and initiate an appropriate MPC protocol in response to the data query/request; an encryption module 242 configured to encrypt an output (MPC output) of the computer device 210A based on encryption information provided in the data query/request; and a verification module 243 configured to generate and provide a computational proof with the output in a response to the data query/request. It should be understood that other computer devices 210B-210D (blockchain nodes) in the contributor network 202 may perform the same functions and/or include the same modules as the exemplary computer device 210A.

The contributor network 206 may include a plurality of computer resources, including computer devices 210A'-210D', for example. Each of the computer devices 210A'-210D' may comprise an instance of the client computer 101 of FIG. 1, or elements thereof. In implementations, the computer devices 210A'-210D' are participants in a permissioned blockchain network. In embodiments, each of the computer devices 210A'-210D' houses computer readable program instructions to cause a series of operational steps to be performed by processor sets (e.g., processor set 110 of FIG. 1) of the respective computer devices 210A'-210D', thereby effecting a computer-implemented method discussed in more detail below.

In the example of FIG. 2, computer device 210A' includes the same modules as computer device 210A, and is configured to perform the same functions described above with respect to computer device 210A. It should be understood that other computer devices 210B'-210D' (blockchain nodes) in the contributor network 202 may perform the same functions and/or include the same modules as the exemplary computer device 210A'.

In implementations of the invention, one of the computer devices 210A-210D of the contributor network 204 is selected as a representative node $P_1$ to participate in an MPC protocol collectively performed by a plurality of contributor networks (e.g., contributor networks 204 and 206). Likewise, in implementations of the invention, one of the computer devices 210A'-210D' of the contributor network 206 is selected as a representative node $P_2$ to participate in the MPC protocol. In the example of FIG. 2, the computer device 210A is selected as a representative node $P_1$ of the contributor network 204, which is a first permissioned blockchain network, and the computer device 210A' is selected as a representative node $P_2$ of the contributor network 206, which is a second permissioned blockchain network.

Each of the client devices 208A-208D, computer devices 210A-210D and computer devices 210A'-210D' may include additional or fewer modules than those shown in FIG. 2. In embodiments, separate modules may be integrated into a single module. Additionally, or alternatively, a single module may be implemented as multiple modules. Moreover, the quantity of devices and/or networks in the collaborative computation environment 201 is not limited to what is shown in FIG. 2. For example, additional participating networks (e.g., blockchain networks) may be included in the collaborative computation environment 201. In practice, the collaborative computation environment 201 may include additional devices and/or networks; fewer devices and/or networks; different devices and/or networks; or differently arranged devices and/or networks than illustrated in FIG. 2.

Figure 3:
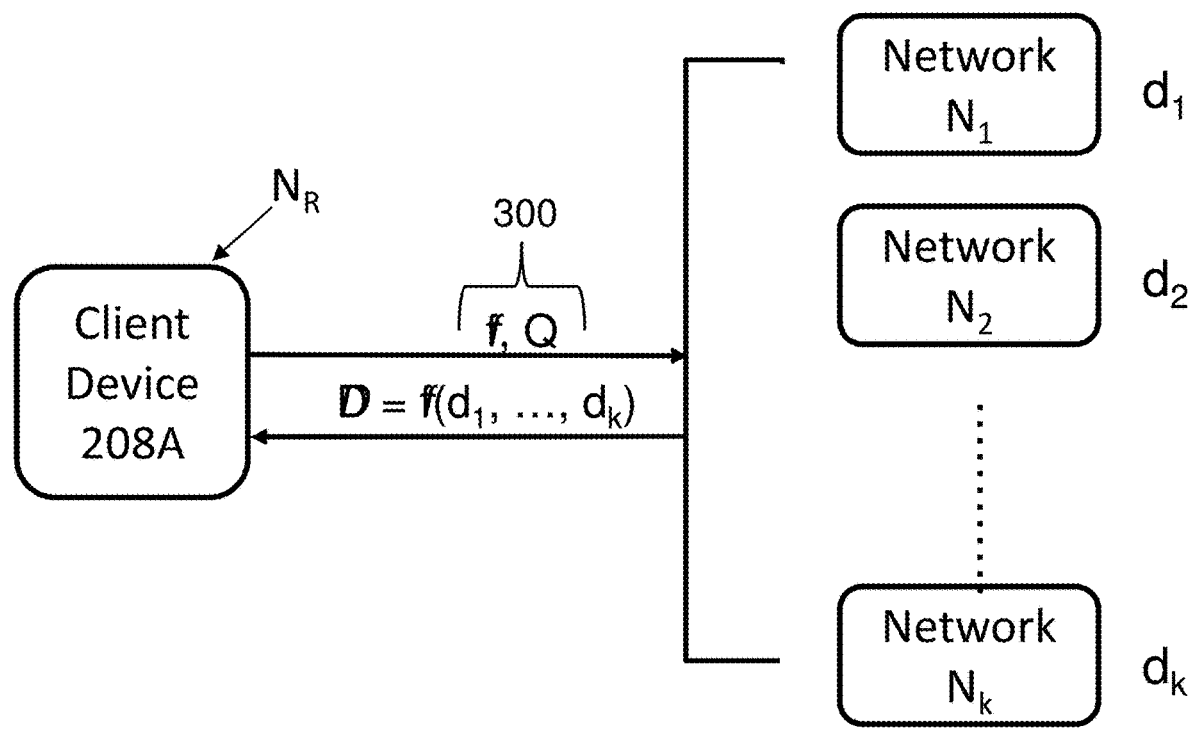
FIG. 3 illustrates communications between participating networks in accordance with aspects of the present invention.

FIG. 3 illustrates communications between participating networks in accordance with aspects of the invention. Elements of FIG. 3 may be carried out in the environment of FIG. 2, and are described with reference to elements depicted in FIG. 2.

In the example of FIG. 3, the client device 208A is the requesting computing system $N_R$, which sends MPC requests or queries 300 to each of a plurality of participating networks $N_1, N_2 \ldots N_k$ (including, for example, contributor networks 204 and 206 of FIG. 2) to initiate a cross-blockchain network computation in accordance with embodiments of the invention. The MPC requests 300 include a computational function $f$ to be computed over data (e.g., raw data from storage modules 250, 250') from the participating networks $N_1$-$N_k$, and a query Q indicating the participating networks $N_1$-$N_k$ and the data requested from the participating networks $N_1$-$N_k$. Each participating network $N_1$-$N_k$ performs an MPC protocol in cooperation with the other participating networks to generate respective outputs $d_1, d_2 \ldots d_k$. Additionally, each participating network $N_1$-$N_k$ sends their final output generated based on the computational function $f$ to the requesting computing system $N_R$. In this way, the requesting computing system $N_R$ can generate a final output D of aggregated, derived data useful to the requesting computing system $N_R$. It can be understood that different data (e.g., raw data) can be required from the different participating networks $N_1$-$N_k$, to execute the desired computational function $f$. While the raw data may be private, the index module 221 may indicate to the requesting computing system $N_R$ the type of information that is available from each of the participating networks $N_1$-$N_k$, so that the MPC requests 300 can be generated and sent to the appropriate participating networks $N_1$-$N_k$, necessary to perform the cooperative computational function $f$.

In embodiments, a system and method for a recipient network (e.g., requesting computing system $N_R$) is provided to obtain aggregately processed data from multiple contributing networks ($N_1, \ldots, N_k$) while ensuring: validity of inputs (inputs to the processing, which come from the individual networks $N_1, \ldots, N_k$, are valid according to consensus rules of the providing network); validity of computation ($N_R$ can verify that the processing is performed correctly); high availability (offers resilience to the failure of any single network member $N_1, \ldots, N_k$ during the private computation); and data confidentiality. In implementations, data confidentiality is ensured: (1) against other networks (any participating network $N_1, \ldots, N_k$ does not learn any more information about data in other participating networks in the process); (2) against recipient network ($N_R$ does not learn about raw data in any participating network $N_1, \ldots, N_k$); and (3) for result confidentiality (contributing networks $N_1, \ldots, N_k$ do not learn anything about the result except for what they learn from their own input and the computation description).

Figure 4:
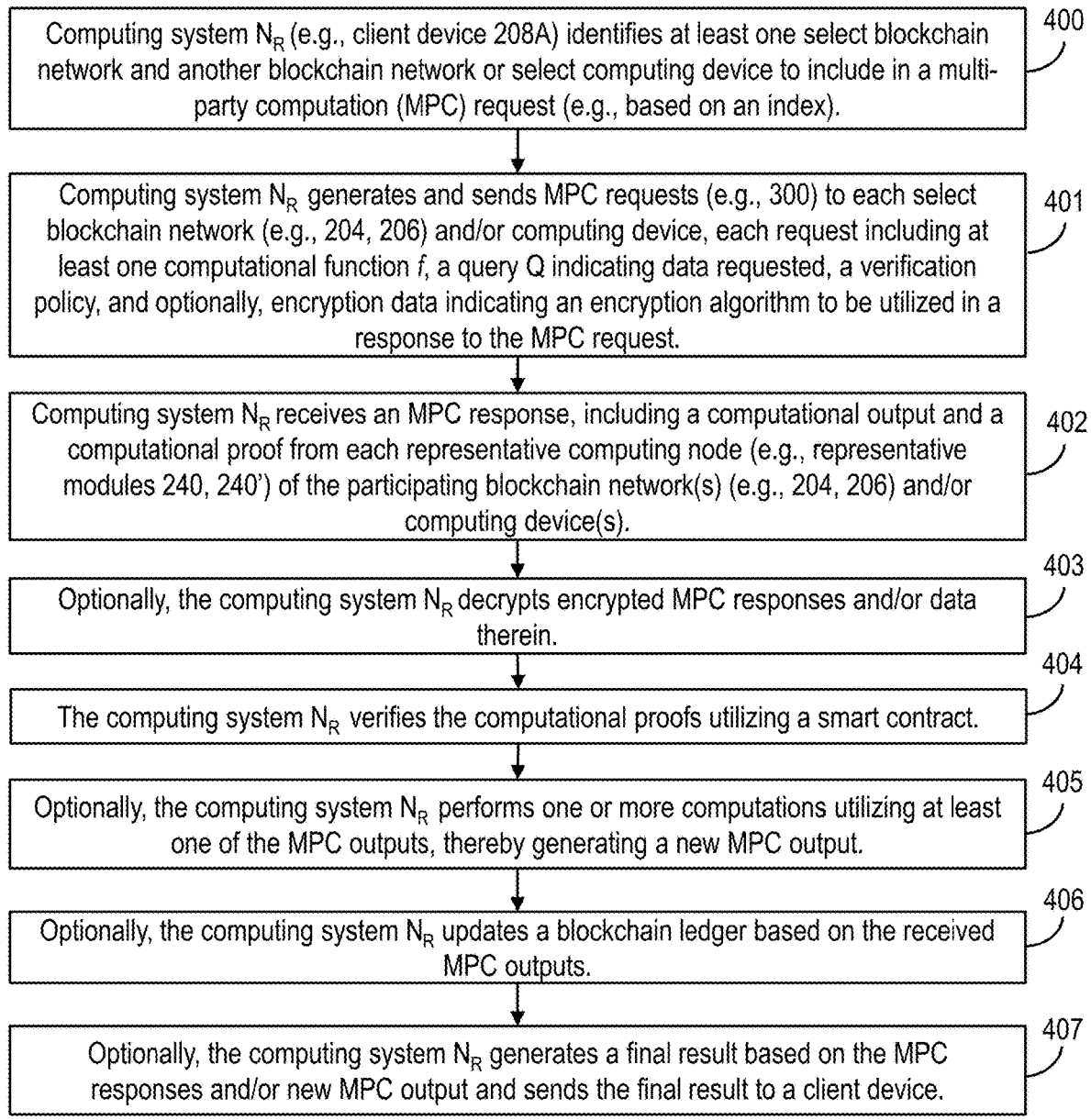
FIG. 4 shows a flowchart of an exemplary MPC method from the perspective of a requesting computing system in accordance with aspects of the present invention.

FIG. 4 shows a flowchart of an exemplary MPC method from the perspective of a requesting computing system in accordance with aspects of the present invention. Steps of the method may be carried out in the environment of FIG. 2 and are described with reference to elements depicted in FIG. 2.

At step 400, a requesting node (hereafter computing system $N_R$) identifies at least one blockchain network (e.g., 204, 206) and one or more other blockchain networks and/or computing devices (e.g., non-blockchain or stand-alone devices) to include in a multi-party computation (MPC) request. In the example of FIG. 2, the computing system $N_R$ is represented by client device 208A. In implementations, the computing system $N_R$ determines which blockchain networks and/or computing devices to include in the MPC request from a list of possible networks and/or computing devices in an index, wherein the index associates types of data with the listed networks and/or computing devices. In aspects, an index of a plurality of blockchain networks and/or computing devices indicates a type of data obtainable from each of the plurality of blockchain networks and/or computing devices. Accordingly, based on the type of information needed by the computing system $N_R$, computing system $N_R$ can determine which blockchain networks and/or computing devices to include in the MPC request based on the index. The computing system $N_R$ may be a requesting node that is part of a network, such as a permissioned blockchain network, or may be an individual computing system or device. In embodiments, step 400 is implemented by the index module 221 of client device 208A.

At step 401, the computing system $N_R$ generates and sends MPC requests or queries (e.g., 300) to the at least one select participating blockchain network $N_1$-$N_k$ (e.g., contributor networks 204, 208) and the other select participant blockchain network(s) or computing device(s) (e.g., 208B-208D) based on the determination at step 400. In implementations, computing system $N_R$ sends the MPC request to network addresses associated with the select participating blockchain network(s) $N_1$-$N_k$ and/or the select computing device(s) based on the determination at step 400 and information (e.g., addresses) from the index module 221. In one example, the computing system $N_R$ generates and sends an MPC request to at least one node of a blockchain network and another participating computing device, which is not part of a blockchain network.

In embodiments, each MPC request includes information necessary for each participating blockchain network(s) (e.g., 204, 206) and/or other select computing device(s) to identify the other participating blockchain network(s) and/or computing device(s), as well as the type of information sought from each participating blockchain network(s) and/or computing device(s) so that a representative node of each participating blockchain network and/or select computing device can participate in an MPC protocol with one another. In implementations, the communication between the representative nodes and/or computing devices is carried out using a cross-network communication protocol. It should be understood that various cross-network data sharing protocols may be utilized in accordance with embodiments of the invention, and the invention is not intended to be limited to a particular cross-network data sharing protocol. The term cross-network data sharing protocol as used herein refers to a set of established rules that dictate how to format, transmit and receive data between the participating blockchain network(s) and/or computing device(s) (cross-network communications) such that integrity of the underlying blockchain network(s) and/or computing device(s) is retained. In implementations, each round of computations or steps in the MPC protocol is performed cooperatively by the participating blockchain network(s) and/or select computing device(s) where each participating blockchain network performs its local transactions based on the local state in its ledger (blockchain ledger) and the data obtained from the cross-network communications. In embodiments, transactions performed between the participating blockchain networks constitute blockchain transactions recorded in the respective distributed blockchain ledgers.

In embodiments, each MPC request includes at least one computational function $f$ to be cooperatively calculated by a node (e.g., computer devices 210A-210D or 210A'-210D') of the at least one participating blockchain network(s) $N_1$-$N_k$ and at least one other participating computing device (e.g., a node of another participating blockchain network) during an MPC protocol, a query Q indicating the participating network(s) $N_1$-$N_k$ and/or other computing device(s), and data requested/required from each of the participating network(s) $N_1$-$N_k$ and/or other computing device(s). In implementations, the MPC request further includes a verification policy chosen by the computing system $N_R$, which can be stricter or more relaxed than verification policies of the respective participating blockchain network(s) $N_1$-$N_k$ and/or participating computing device(s). In aspects of the invention, the verification policy is different across the different blockchain networks $N_1$-$N_k$ and/or computing devices. In embodiments, the MPC request also includes encryption data indicating an encryption algorithm to be utilized in a response to the MPC request. In embodiments, step 401 is implemented by the request module 220 of client device 208A.

At step 402, the computing system $N_R$ receives an MPC response to the MPC request, including a computational output (MPC output) and an associated computational proof, from each participating blockchain network $N_1$-$N_k$ (e.g., 204, 206) and/or computing device. In embodiments, the MPC responses of the participating blockchain networks and/or computing device are all the same (i.e., are a common output). In aspects of the invention, the computational proof provides end-to-end provenance of the creation of the computational output of the MPC protocol. Moreover, the computational proof may provide a guarantee on the validity of the computational inputs to the computing system $N_R$, as well as a guarantee on the correctness of the computational output. In implementations, each response includes data encrypted based on the encryption data provided in the MPC request. In embodiments, step 402 is implemented by the request module 220 of client device 208A.

Optionally, at step 403, the computing system $N_R$ decrypts encrypted MPC responses or encrypted data receiving with the responses. In implementations, the computing system $N_R$ decrypts encrypted data in the MPC responses using a private key before submitting the decrypted data with the computational proof to a smart contract for verification and consensus at step 404. In embodiments, step 403 is implemented by the data module 222 of client device 208A.

At step 404 the computing system $N_R$ verifies the computational proofs from each of the participating blockchain networks $N_1$-$N_k$ and/or computing devices utilizing a smart contract. In implementations, the smart contract is a smart contract for MPC result integrity validation comprising a computer program configured to automatically execute actions (e.g., updating a blockchain ledger) when the MPC response complies with validation requirements of a predetermined agreement. For example, the smart contract may be used to determine a minimum number of signatures is present in the computational proof. In embodiments, step 404 is implemented by the verification module 223 of client device 208A.

Optionally, at step 405 the computing system $N_R$ performs one or more computations utilizing at least one computational output from the MPC responses, thereby generating a new MPC output. Any computation desired by the computing system $N_R$ may be performed at step 405, and embodiments of the invention are not intended to be limited to any particular computations. For example, the computing system $N_R$ may wish to calculate a sum, median, average or other computation based on data in the MPC output. In embodiments, step 405 is implemented by the data module 222 of client device 208A.

Optionally, at step 406 the computing system $N_R$ updates a blockchain ledger based on the results received at step 402 and/or the new MPC output generated at step 405. One of ordinary skill in the art would understand how to update a blockchain ledger. In implementations, the computing system $N_R$ creates a new block on the blockchain ledger including the results received at step 402, a new hash value derived from the results, and a hash value of a previous block in the blockchain ledger. In aspects, step 406 is implemented in response to a verification of the computational proofs at step 404. In embodiments, step 406 is implemented by the ledger module 224 of client device 208A.

In embodiments, the computing system $N_R$ may be configured to initiate an MPC protocol based on a request received from a user (e.g., via a client device of the environment 201), such as through a user interface provided by the computing system $N_R$.

Optionally, at step 407 the computing system $N_R$ generates a final result based on the MPC responses and/or new MPC output and sends the final result to a user who requested the information (e.g., via client device 210D). In implementations, the final result comprises a result from calculating the function $f$ of the MPC request. In embodiments, the final result comprises a result calculated from one or more additional computations based on an input from the MPC responses. In embodiments, step 407 is implemented by the request module 220 of client device 208A.

Figure 5:
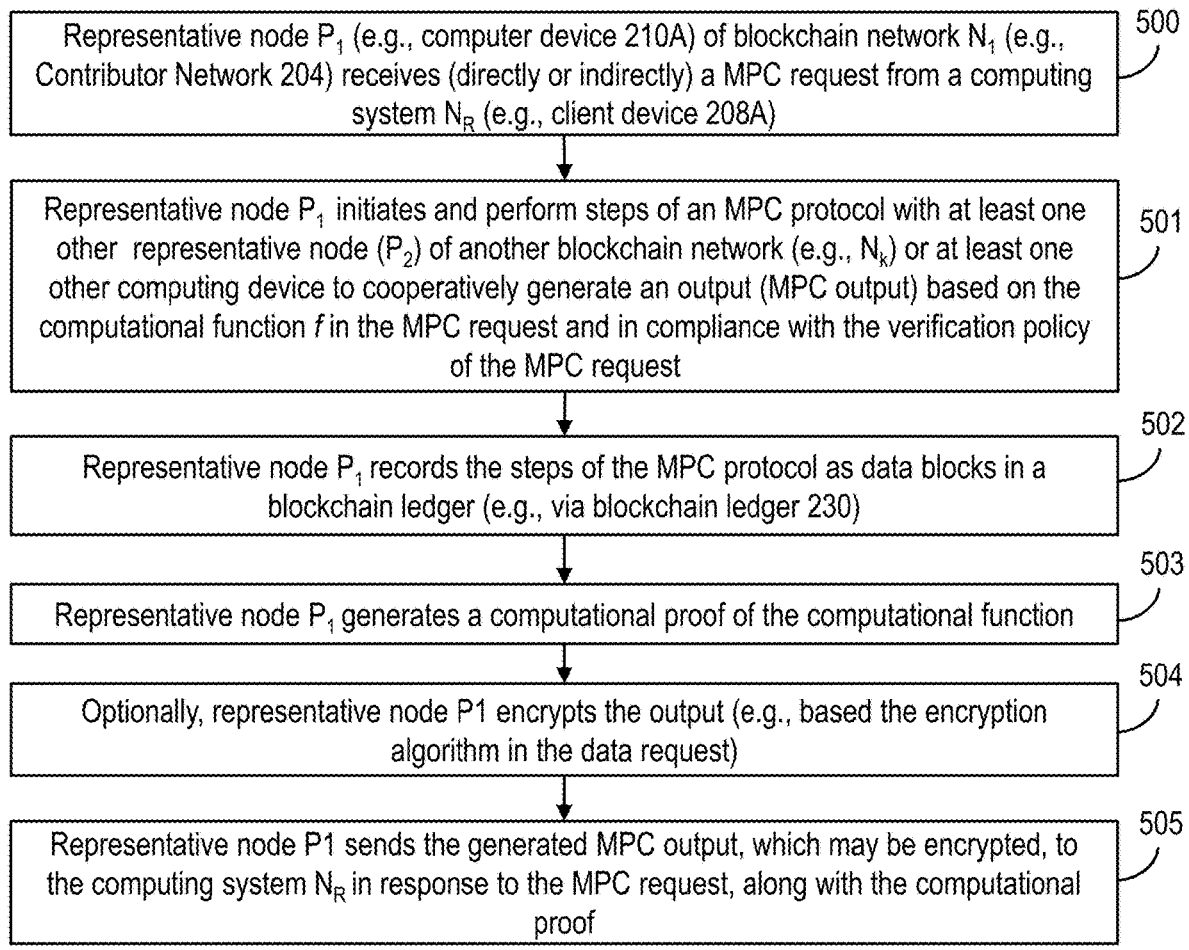
FIG. 5 shows a flowchart of an exemplary MPC method from the perspective of a participating blockchain network in accordance with aspects of the present invention.

FIG. 5 shows a flowchart of an exemplary MPC method from the perspective of a participating blockchain network in accordance with aspects of the present invention. Steps of the method may be carried out in the environment of FIG. 2 and are described with reference to elements depicted in FIG. 2. For each blockchain network (e.g., 204, 206) that receives an MPC request from a computing system $N_R$, the following steps are performed. In aspects of the invention, before starting an MPC protocol, a blockchain network elects a representative, which can be a single blockchain node (e.g., computer device 208A) or a set of blockchain nodes (e.g., computer devices 201A and 210B). Each representative of a blockchain network must have a signature that satisfies the verification policy of the MPC request. For simplicity's sake, the representative is referred to hereafter as representative node $P_1$ of the select blockchain network $N_1$.

At step 500, a representative node $P_1$ (e.g., computer device 210A of contributor network 204) of a select blockchain network $N_1$, receives an MPC request (e.g., query 300) from the computing system $N_R$ (e.g., client device 208A) in accordance with step 401 of FIG. 4. In implementations, the MPC request includes at least one computational function $f$ to be cooperatively calculated by the representative node $P_1$ and one or more other representative nodes of select blockchain networks and/or other select computing devices during an MPC protocol, as well as the data needed for the computational function $f$ from each participant. In aspects of the invention, the MPC request further includes a verification policy chosen by the computing system $N_R$.

In implementations of the invention, the MPC request is directed to the representative node $P_1$ by another computing node (e.g., 210D) of the blockchain network $N_1$ that first receives the MPC request from the computing system $N_R$. In embodiments, a computing device of the select blockchain network $N_1$ selects one or more nodes of the blockchain network $N_1$ to act as a representative to initiate/manage an MPC protocol in accordance with the MPC request. In the example of FIG. 2, a representative module 240 incorporated with or in communication with the computer device 210A, receives the MPC request from the computing system $N_R$ and randomly selects the computer device 210A as the representative node $P_1$. In embodiments of the invention, no trust assumptions on the representative node $P_1$ are required.

Embodiments of the invention provide the benefit of replaceability of the computing node (e.g., $P_1$) representing a participating blockchain network. One benefit of replaceability is that all representatives (e.g., representative node $P_1$) are accountable for their actions, and their steps can be audited actively and passively. In implementations, active audits of a representative node occur via a smart contract that verifies that a computation of a next step is correct, and the approval of the computation is part of the verification policy (authentication policy). In aspects of the invention, passive audits may be performed after a computation is calculated, whereby the computation can be re-calculated to verify that each step was executed properly.

At step 501, the representative node $P_1$ initiates and performs steps of an MPC protocol with at least one other representative node (e.g., $P_2$) of another blockchain network $N_k$ or at least one other computing device, to cooperatively generate an output (MPC output) based on the computational function $f$ and query Q in the MPC request, and in compliance with the verification policy of the MPC request. In embodiments, computing devices other than the representative nodes of blockchain networks also participate in the MPC request.

In implementations, the representative node $P_1$ queries its blockchain network $N_1$ to obtain intermediate data $d_i$ (e.g., from storage modules 250) that is to be input to the MPC protocol along with the proof of the correctness of $d_i$. An MPC protocol may be split in rounds (steps), wherein at each round a participant (e.g., a representative node of each blockchain network) computes a next message to broadcast to other participants (e.g., other representative nodes) as a function of a current history and freshly chosen randomness for that round. In order to allow replicability of the representative node, each step of the MPC computation is tracked on the blockchain (e.g., via blockchain ledger module 230), as described herein at step 502, for example. In embodiments, the query module 241 of the representative node $P_1$ implements step 501. An illustrated example of an MPC protocol according to embodiments of the invention is discussed below with respect to FIG. 6.

At step 502, the representative node $P_1$ records the steps of the MPC protocol as data blocks in a blockchain ledger. For each round or step of an MPC protocol, a current representative node publishes on the blockchain: (1) messages received from the other participant node(s) and/or computing device(s), and (2) a chosen randomness for that round. For example, in implementations, for each step of the MPC protocol, a block is saved on the blockchain ledger including the message or results received from the other participant node(s) and/or computing device(s), a hash value derived from the message or results, and a hash value of a previous block in the blockchain ledger. This is sufficient to: (1) verify the entire computation carried by the representative node $P_1$ at that point in time, and (2) continue the computation from the last round stored on the blockchain ledger. In embodiments, the blockchain ledger module 230 of the representative node $P_1$ implements step 502.

At step 503, the representative node $P_1$ generates a computational proof of the output computation that complies with the verification policy of the MPC request. In embodiments, the computational proof is a computer-assisted proof (e.g., proof-by-exhaustion) of a mathematical theorem that provides a proof that the result of computations implies the given theorem. The type of computational proof that may be utilized by embodiments of the present invention is not limited to any particular computational proof, and one of ordinary skill in the art could determine the computational proof appropriate for a given MPC protocol. In implementations, the computational proof indicates to the computing system $N_R$ that the device of the representative node $P_1$ (e.g., 210A) was chosen as a representative of the blockchain network to answer the MPC request. In aspects of the invention, the computational proof provides end-to-end provenance of the creation of the output computation (e.g., based on the data blocks recorded in at least one blockchain ledger).

In implementations, intermediate data $d_1$ generated in the MPC protocol rounds (steps) are verified via a smart contract at the respective representative nodes. The smart contract verifies the following: (1) the input chosen by the representative node; (2) the computation; (3) the data that was communicated to other nodes of blockchain networks and/or other computing devices; and (4) the data that was received from other nodes of blockchain networks and/or other computing devices. Alternatively, this verification can be done after each round of the MPC protocol. At the end of the MPC protocol, if all verifications succeed, the blockchain ledger record with the network participant's attestations will constitute a proof of correctness of the MPC result/output. In embodiments, the verification module 230 of the representative node $P_1$ implements step 503.

Optionally, at step 504, the representative node $P_1$ encrypts data (e.g., the output of the MPC request) to be included in a response to the MPC request. In embodiments, the encryption module 242 encrypts data based on the encryption information provided in the MPC request.

At step 505, the representative node $P_1$ sends the generated MPC output, which may be encrypted, to the computing system $N_R$ in the response to the MPC request, along with the computational proof generated at step 503. In embodiments, the representative module 240 of the representative node $P_1$ implements step 505.

It can be understood that steps 500-505 are also performed by other participating representative nodes of other selected blockchain networks (e.g., representative node $P_2$ of blockchain network $N_k$) to cooperatively generate a computation based on the computational function $f$, such that the computing system $N_R$ receives an MPC output from each of the selected participating blockchain networks in response to an MPC request received from the computing system $N_R$. Likewise, other participating computing devices may perform the steps of FIG. 5, with the exception that computing devices that are not part of blockchain networks will not record steps of the MPC protocol as data blocks in a blockchain ledger. The MPC protocol may be implemented by a small number of participants (e.g., two or more participants), or a large number of participants, and is not limited to the examples discussed herein. In embodiments, the MPC outputs from the blockchain networks are all the same (i.e., are a common output). In aspects, receiving the same MPC output from each of the selected blockchain networks can indicate a successful completion of the MPC protocol.

FIG. 6 illustrates an exemplary three step MPC protocol among representative nodes of three blockchain networks in accordance with aspects of the present invention. Steps illustrated in FIG. 6 may be performed in the collaborative computation environment 201 of FIG. 2 in accordance with step 501 of FIG. 5.

In the example of FIG. 6, a representative node $P_1$ of a blockchain network communicates with other representative nodes $P_2$ and $P_3$ of other participating blockchain networks. In implementations, each blockchain network that receives an MPC request from the computing system $N_R$ has a representative node (e.g., $P_1$, $P_2$, $P_3$) that records, on a shared distributed blockchain ledger, sufficient intermediate data from the MPC protocol using blockchain transactions. This enables each blockchain network to validate the actions of the representative nodes (e.g., $P_1$, $P_2$, $P_3$), and improves the fault-tolerance of the system.

With continued reference to FIG. 6, each of the representative nodes $P_1$, $P_2$, $P_3$ communicates with one another using a cross-network data sharing protocol. It should be understood that various cross-network data sharing protocols may be utilized in accordance with embodiments of the invention, and the invention is not intended to be limited to a particular cross-network data sharing protocol. The term cross-network data sharing protocol as used herein refers to a set of established rules that dictate how to format, transmit and receive data between blockchain networks. Each representative node $P_1$, $P_2$, $P_3$ generates data $d_1$, $d_2$, $d_3$ needed to perform cross-network computations. For example, at step 1, representative node $P_1$ generates intermediate data $X_{11}$, $X_{12}$, $X_{13}$ to be utilized by respective representative nodes $P_1$, $P_2$, $P_3$ to generate respective outputs 600A, 600B, 600C at step 2 of the MPC protocol.

In implementations, each step of the MPC protocol is executed by the representative nodes $P_1$, $P_2$, $P_3$, and each representative node $P_1$, $P_2$, $P_3$ signs an output, wherein the output is only accepted by another of the representative nodes $P_1$, $P_2$, $P_3$ if accompanied by enough signatures in accordance with the verification policy of the MPC request. In embodiments, the verification policy is an authentication policy that represents a trust assumption on the source of a given message. If a message is accompanied by enough signatures that satisfy the policy, then the message is deemed authentic. In implementations, each participant (via a representative node $P_1$, $P_2$, $P_3$) uses the same authentication policy.

By way of example, representative node $P_3$ may send an output of intermediate data $X_{31}$ in a transaction 602 to representative node $P_1$ with assurance of provenance (proof that $X_{31}$ was recorded in the shared blockchain ledger of $P_3$). Representative node $P_1$ may then use the intermediate output $X_{31}$ to calculate/generate another intermediate output ($Y_{11}$, $Y_{12}$, $Y_{13}$) at step 2. The intermediate output data $Y_{13}$ may then be sent in a transaction 604 from representative node $P_1$ to representative node $P_3$ to be used in a calculation at step 3. The final MPC output of each representative node $P_1$, $P_2$, $P_3$ obtained through the calculations of steps 1-3 is represented at z. In embodiments, at each step, a representative node computes a proof that the next message has been computed correctly. If the proof is a zero-knowledge proof (ZKP) the proof can be delivered to the other MPC participates (other representative nodes), otherwise the proof can be verified by the other node(s) forming the representative and signatures are attached to the next message (executed policy).

In accordance with embodiments of the invention, input certifiability ensures that a participant (via a representative node) is using the proper input (e.g., $X_1$) to participate in the MPC protocol. To achieve this, a certification method is applied to the function $f$ to be computed. In one example, the function to be computed by the participating blockchain networks=$f(x\_1, \ldots x\_n)$. Instead of computing $f$, each participating blockchain network (via their representative node(s)) computes F, such that: each input x_i consists of the data x_i' and a set of signatures over x_i'. For each i, F has a verification policy against which the accompanying signatures are checked. If for each input, the relative verification policy is satisfied, then the computation continues by computing $f$. In this way, the inputs remain private to each participating blockchain network, and at the same time all of the participating blockchain networks gain an assurance that inputs to $f$ are certified.

Figure 7:
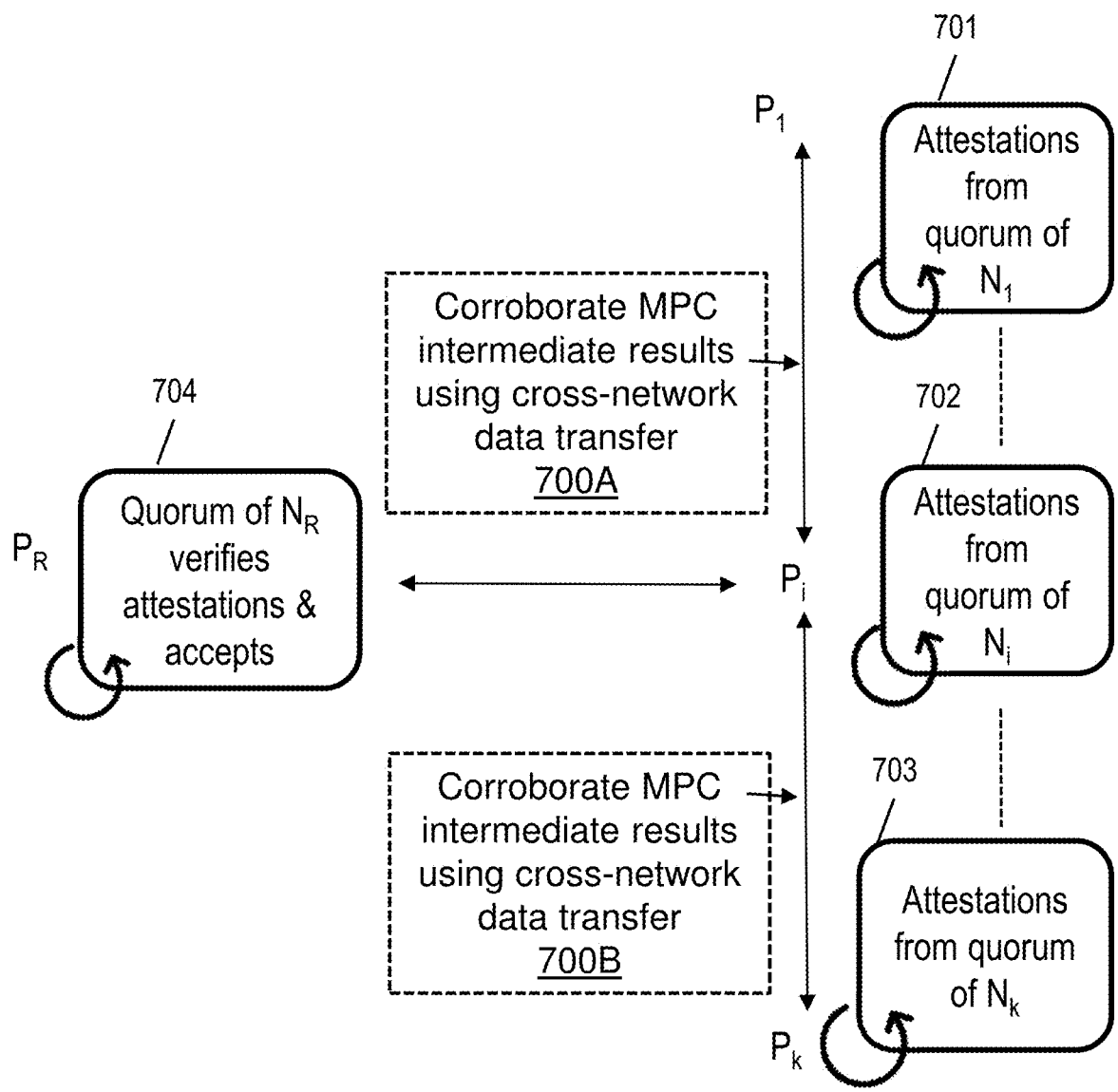
FIG. 7 is a workflow diagram illustrating a data privacy preserving communication protocol among the participants of a collaborative computing process in accordance with aspects of the present invention.

FIG. 7 is a workflow diagram illustrating a data privacy preserving communication protocol among the participants of a collaborative computing process in accordance with aspects of the present invention. More specifically, FIG. 7 illustrates an MPC protocol cooperatively performed for a requesting node $P_R$ (e.g., client device 208A) of the computing system $N_R$, by a first representative node $P_1$ of a first blockchain network $N_1$, an intermediary representative node $P_i$ of a second blockchain network $N_i$, and a final representative node $P_k$ of another blockchain network $N_k$. As illustrated at blocks 700A and 700B, the representative nodes $P_1$, $P_i$, and $P_k$ corroborate intermediate MPC results using a cross-network data sharing protocol. In this example, a quorum of parties/blockchain nodes is required to comply with the verification policy. In the example of FIG. 7, at 701 the first representative node $P_1$ receives attestations from a quorum of nodes of the first blockchain network $N_1$, at 702 the intermediary representative node $P_i$ receives attestations from a quorum of nodes of the second blockchain network $N_i$, and at 703 the final representative node $P_k$ receives attestations from a quorum of nodes of the other blockchain network $N_k$. Each of the contributing blockchain networks $N_1$, $N_i$, and $N_k$ contribute to the MPC protocol without learning each other's private data using the illustrated data privacy preserving communication protocol of FIG. 7. The requesting node $P_R$ verifies attestations and accepts the results at 704.

Figure 8:
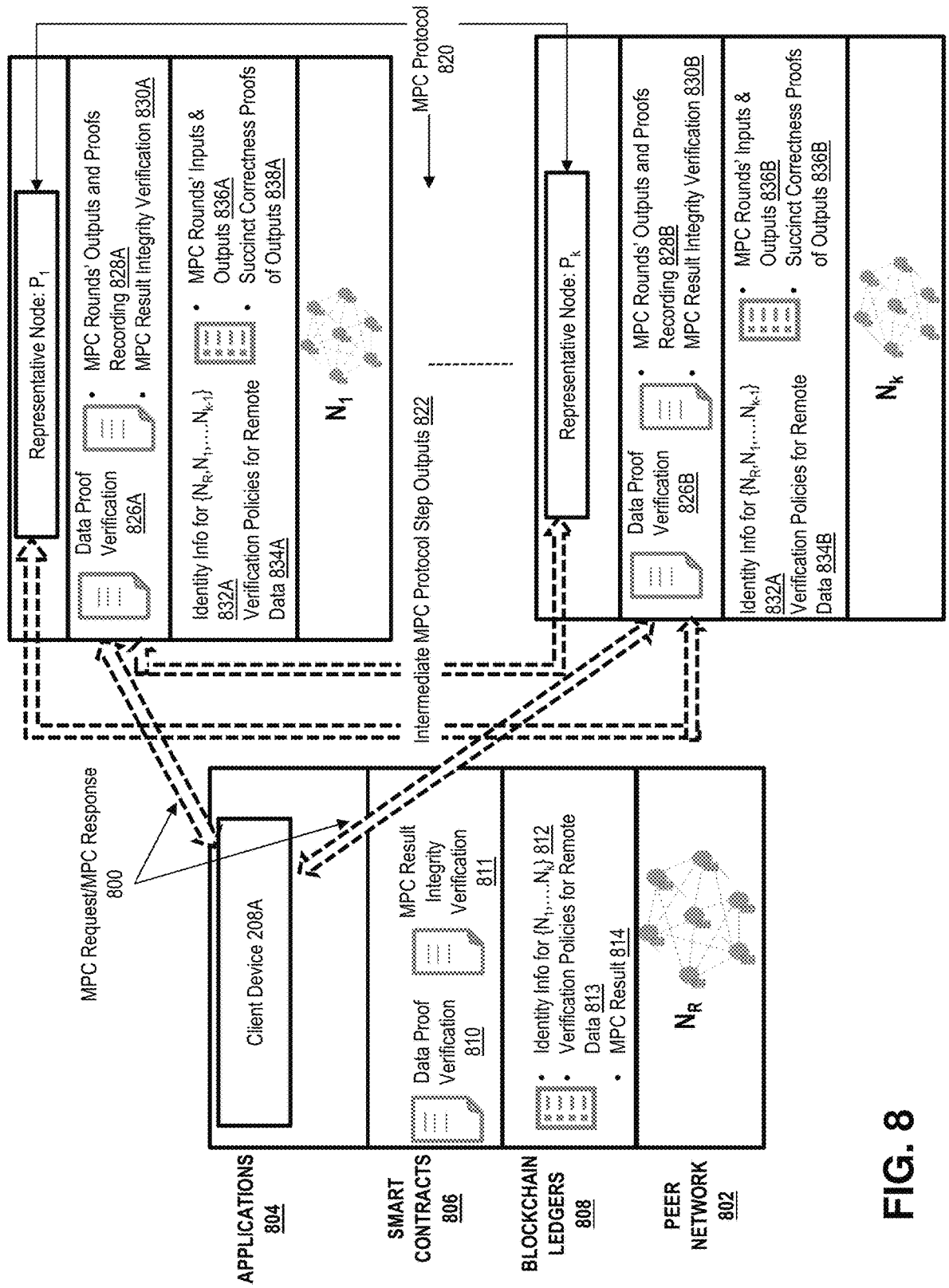
FIG. 8 illustrates exemplary system architecture to implement the methods of FIGS. 4 and 5 in accordance with aspects of the present invention.

FIG. 8 illustrates exemplary system architecture to implement the methods of FIGS. 4 and 5 in accordance with aspects of the present invention. Steps illustrated in FIG. 8 may be carried out in the environment of FIG. 2 and are described with reference to elements depicted in FIG. 2.

In the example of FIG. 8, the client device 208A is a query/response client sending MPC requests (queries) to select blockchain networks $N_1$ and $N_k$, wherein an MPC protocol is performed by select representative nodes $P_1$ and $P_k$ of the respective blockchain networks $N_1$ and $N_k$ in accordance with embodiments of the invention to return an MPC response, as indicated at 800. In this example, the client device 208A is a computing system $N_R$ within a peer network 802, and includes one or more software applications 804 configured to generate and send the MPC request (e.g., request module 220, smart contracts 806, and blockchain ledgers 808). In general, smart contracts comprise a computer program or a transaction protocol which is intended to automatically execute, control or document legally relevant events and actions according to the terms of a contract or an agreement. The smart contracts 806 of FIG. 8 enable the client device 208A to generate a data proof verification 810 and an MPC result integrity verification 811. In implementations, the blockchain ledgers 808 provide identifying information for participating networks 812, verification policies for remote data 813, and storage of MPC results 814.

In response to receiving the MPC request from the client device 208A, the select representative nodes $P_1$ and $P_k$ cooperatively perform an MPC protocol represented at 820 to compute a function $f$ using multiple steps or rounds of calculations to generate intermediate MPC protocol outputs 822. Once the MPC protocol 820 is completed, each of the representative nodes $P_1$ and $P_k$ send a final MPC output 824 to the requesting client device 208A, along with a respective data proof verification 826A, 826B. Each representative node $P_1$ and $P_k$ records the outputs from the MPC rounds and associated proofs (e.g., in blockchain ledgers) as indicated at 828A, 828B, and generates a respective MPC result integrity verification 830A, 830B. In the example of FIG. 8, each representative node $P_1$ and $P_k$ stores identifying information for participating networks 832A, 832B, and verification policies for remote data 834A, 834B. Each representative node $P_1$ and $P_k$ obtains inputs from the other representative node, and sends outputs to the other representative node during the MPC protocol, as indicated at 836A, 836B, and generates succinct correctness proofs of the outputs, as indicated at 838A, 838B. In implementations, the data proof verification 826A, 826B is utilized in validating data obtained through cross-network data sharing, and the MPC result integrity verification 830A, 830B is utilized to ensure that each representative node $P_1$ and $P_k$ correctly performs the MPC protocol steps using a local ledger state and data obtained through the cross-network data sharing from the other participating networks.

Based on the above, it can be seen that embodiments of the invention provide: (1) authentication: other participants are able to authenticate messages coming from a blockchain network (wherein the blockchain network appears as a single logical entity); (2) replaceability/robustness: it does not matter which blockchain nodes are forming the single logical entity that is participating in an MPC protocol (the nodes of the blockchain network can change even during the MPC protocol execution); (3) accountability: the nodes of the blockchain network forming the single logical entity are accountable; (4) input certifiability: the blockchain network can certify that an output $X_1$ is really coming from its blockchain ledger; (5) result certification: the party that triggered the computation gets the result of the computation certified by the participating blockchain networks; and (6) interoperability between decentralized/centralized systems as MPC protocol participants.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying, by a computing system, a select blockchain network and a select computing device to perform a multi-party computation (MPC) based on an index of a plurality of blockchain networks and computing devices indicating a type of data obtainable by each of the plurality of blockchain networks and computing devices;
    generating, by the computing system, an MPC request including at least one computational function to be performed cooperatively by the select blockchain network and the select computing device, data required for the at least one computational function from each of the select blockchain network and the select computing device, and a verification policy defining at least one verification protocol to be performed by each of the select blockchain network and the select computing device;
    sending, by the computing system, the MPC request to each of the select blockchain network and the select computing device via a network connection; and
    receiving, by the computing system, a response from a representative computing node of the select blockchain network and a response from the select computing device, wherein each of the responses includes:
    an MPC output of an MPC protocol performed by the select blockchain network and the select computing device to jointly compute the at least one computational function over inputs of the respective select blockchain network and select computing device while keeping the respective inputs private from one another and private from the computing system; and
    a computational proof based on the verification policy, the computational proof providing end-to-end provenance that guarantees (i) validity of the inputs received by the computing system and (ii) correctness of the MPC output.

2. The method of claim 1, further comprising verifying, by the computing system, the computational proofs of the respective responses utilizing a smart contract.

3. The method of claim 2, wherein the select computing device comprises a representative computing node of another select blockchain network, and the select blockchain network comprises at least two blockchain networks, such that at least three select blockchain networks participate in the MPC, and wherein for each of the select blockchain networks, the smart contract verifies: a data input chosen by one of the representative computing nodes; a computation of the MPC output; data communicated by the one of the representative computing nodes to other ones of the representative computing nodes; and data received by the one of the representative computing nodes from the other of the representative computing nodes.

4. The method of claim 1, wherein the MPC output from the select blockchain network and the MPC output from the select computing device are identical, and comprise a common output.

5. The method of claim 4, further comprising determining, by the computing system, validity of the MPC outputs as a result of determining that each of the select blockchain network and the select computing device provided the common output, wherein the common output attests to the validity of the MPC outputs.

6. The method of claim 1, wherein the MPC outputs are encrypted based on information provided in the MPC request, the method further comprising decrypting, by the computing system, the MPC outputs based on the information.

7. The method of claim 1, further comprising performing, by the computing system, at least one computation utilizing the MPC output from the select blockchain network or the MPC output from the select computing device, thereby generating a computational result.

8. The method of claim 1, wherein the computing system is a node of another blockchain network, the method further comprising updating, by the computing system, a blockchain ledger of the computing system based on the received MPC outputs.

9. The method of claim 1, wherein for the select blockchain network, the proof of validation is based on recorded MPC protocol steps of the MPC protocol executed between the representative computing node of the select blockchain network and the select computing device.

10. The method of claim 1, wherein the computing system includes software provided as a service in a cloud environment.

11. A computer program product comprising one or more computer readable storage media having program instructions collectively stored on the one or more computer readable storage media, the program instructions executable to:
- send, by a computing system, a multi-party computation (MPC) request to each of a plurality of blockchain networks, the MPC request including at least one computational function to be performed cooperatively by the plurality of blockchain networks, data inputs required for the at least one computational function, and a verification policy defining at least one verification protocol to be performed by each of the plurality of blockchain networks; and
- receive, by the computing system, a response from respective representative computing nodes of the plurality of blockchain networks, wherein each of the responses includes:
  - an MPC output; and
  - a computational proof based on the verification policy, the computational proof providing end-to-end provenance that guarantees (i) validity of the data inputs received by the computing system and (ii) correctness of the MPC output,
- wherein the MPC output is jointly computed by the plurality of blockchain networks using an MPC protocol while keeping raw data of the respective plurality of blockchain networks private from one another, and
- wherein the MPC output is computed from, but does not disclose, the raw data from the plurality of blockchain networks.

12. The computer program product of claim 11, wherein the program instructions are further executable to verify the computational proofs of the respective responses utilizing a smart contract.

13. The computer program product of claim 12, wherein, for each of the plurality of blockchain networks, the smart contract verifies: a data input chosen by one of the representative computing nodes; a computation of the MPC output; data communicated by the one of the representative computing nodes to another of the representative computing nodes; and data received by the one of the representative computing nodes from the other of the representative computing nodes.

14. The computer program product of claim 11, wherein each of the plurality of blockchain networks selects the raw data to use in the MPC protocol based on the data inputs in the MPC request, thereby ensuring validity of inputs to the MPC protocol.

15. The computer program product of claim 11, wherein the program instructions are further executable to determine validity of the MPC outputs as a result of determining that each of the plurality of blockchain networks provided a common output, wherein the common output attests to the validity of the MPC outputs.

16. The computer program product of claim 11, wherein the MPC outputs are encrypted based on information provided in the MPC request and the program instructions are further executable to decrypt the MPC output based on the information.

17. The computer program product of claim 11, wherein the program instructions are further executable to perform at least one computation utilizing the MPC output from one of the plurality of blockchain networks, thereby generating a computational result.

18. A system comprising:
- a processor set, one or more computer readable storage media, and program instructions collectively stored on the one or more computer readable storage media, the program instructions executable by at least one representative computing device of a first blockchain network to:
  - receive a multi-party computation (MPC) request from a remote computing system, the MPC request including at least one computational function to be performed cooperatively by the first blockchain network and a second blockchain network, data inputs required for the at least one computational function, and a verification policy defining at least one verification protocol to be performed by each of the first and second blockchain networks;
  - initiate and perform steps of an MPC protocol with the second blockchain network, thereby cooperatively generating an MPC output based on the at least one computational function in the MPC request and in compliance with the verification policy of the MPC request,
  - wherein the MPC output is jointly computed by the first and second blockchain networks using the MPC protocol while keeping raw data of the respective first and second blockchain networks private from one another, and is computed from, but does not disclose to the remote computing system, raw data from the first and second blockchain networks,
  - wherein each of the first and second blockchain networks selects the raw data to use in the MPC protocol based on the data inputs in the MPC request, thereby ensuring validity of inputs to the MPC protocol, and
  - wherein each step of the MPC protocol is recorded as a data block in a blockchain ledger that includes results received from the second blockchain network, a first hash value derived from the results, and a second hash value of a previous data block in the blockchain ledger; and
  - send the MPC output to the remote computing system in response to the MPC request.

19. The system of claim 18, wherein the program instructions are further executable by the at least one representative computing device of the first blockchain network to:
- generate a computational proof of the computational function, the computational proof providing end-to-end provenance that guarantees (i) validity of the data inputs in the MPC request and (ii) correctness of the MPC output; and
- send the computational proof to the remote computing system.

20. The system of claim 18, wherein the program instructions are further executable by the at least one representative computing device of the first blockchain network to encrypt data of the MPC output based on encryption data provided in the MPC request.

* * * * *